US010296829B2

(12) United States Patent
Mostafa et al.

(10) Patent No.: US 10,296,829 B2
(45) Date of Patent: May 21, 2019

(54) CONVOLUTION PROCESSING APPARATUS AND METHOD

(71) Applicants: SAMSUNG ELECTRONICS CO., LTD., Suwon-si (KR); UNIVERSITAET ZUERICH, Zurich (CH)

(72) Inventors: Hesham Mostafa, San Diego, CA (US); Aimar Alessandro, Opfikon (CH)

(73) Assignees: SAMSUNG ELECTRONICS CO., LTD., Suwon-si (KR); UNIVERSITAET ZUERICH, Zurich (CH)

( * ) Notice: Subject to any disclaimer, the term of this patent is extended or adjusted under 35 U.S.C. 154(b) by 196 days.

(21) Appl. No.: 15/581,872

(22) Filed: Apr. 28, 2017

(65) Prior Publication Data
US 2018/0150721 A1   May 31, 2018

(30) Foreign Application Priority Data

Nov. 28, 2016  (KR) .......................... 10-2016-0159293

(51) Int. Cl.
*G06N 3/08* (2006.01)
*G06N 3/04* (2006.01)
*G06N 3/063* (2006.01)

(52) U.S. Cl.
CPC .............. *G06N 3/08* (2013.01); *G06N 3/0454* (2013.01); *G06N 3/063* (2013.01)

(58) Field of Classification Search
CPC ........ G06N 3/08; G06N 3/063; G06N 3/0454; G06K 9/6232; G06K 9/6256; G06K 9/6267; G06K 9/6292; G06T 2207/20084
See application file for complete search history.

(56) References Cited

U.S. PATENT DOCUMENTS 6,198,843 B1  3/2001  Nakauchi et al.
7,418,128 B2  8/2008  Simard et al.
(Continued)

FOREIGN PATENT DOCUMENTS

KR        10-0165405 B1      3/1999

OTHER PUBLICATIONS

L. Cavigelli et al., "Origami: A Convolutional Network Accelerator", Proceedings of the 25th edition on Great Lakes Symposium on VLSI, 199-204, May 2015, 6 pages total.
(Continued)

*Primary Examiner* — Phuoc Tran
(74) *Attorney, Agent, or Firm* — Sughrue Mion, PLLC

(57) ABSTRACT

A convolution processing apparatus and method are disclosed. The convolution processing apparatus may include a controller configured to load a pixel of an input image and skip a process associated with the pixel in response to a value of the loaded pixel being 0, a filter bank including at least one filter and configured to extract at least one kernel element corresponding to the pixel from the at least one filter based on an index of the pixel and an input channel of the pixel, and a multiplier-accumulator (MAC) configured to perform a convolution operation based on the value of the pixel and a value of the at least one kernel element and accumulatively store an operation result of the convolution operation, the operation result corresponding to an output image.

20 Claims, 7 Drawing Sheets

(56) References Cited

U.S. PATENT DOCUMENTS

| | | |
|---|---|---|
| 7,747,070 B2 | 6/2010 | Puri |
| 8,275,727 B2 | 9/2012 | Elmegreen et al. |
| 8,938,113 B2 | 1/2015 | Kovalan et al. |
| 2013/0120424 A1 | 5/2013 | Nance et al. |
| 2015/0134583 A1 | 5/2015 | Tamatsu et al. |
| 2015/0139485 A1 | 5/2015 | Bourdev |
| 2015/0170021 A1* | 6/2015 | Lupon .................... G06N 3/063 706/15 |
| 2016/0019454 A1 | 1/2016 | LaRue et al. |
| 2016/0026912 A1* | 1/2016 | Falcon ................. G06N 3/0454 706/25 |
| 2016/0086078 A1 | 3/2016 | Ji et al. |
| 2018/0260687 A1* | 9/2018 | Kanno ................. G06N 3/0454 |

OTHER PUBLICATIONS

J. Sim et al., "A 1.42TOPS/W Deep Convolutional Neural Network Recognition Processor for Intelligent IoE Systems", IEEE International Solid-State Circuits Conference, Feb. 2, 2016, Digest of Technical Papers, 3 pages total.

Y. Chen et al., "Eyeriss: An Energy-Efficient Reconfigurable Accelerator for Deep Convolutional Neural Networks", IEEE International Solid-State Circuits Conference, 2016, 44 pages total.

* cited by examiner

CONVOLUTION PROCESSING APPARATUS AND METHOD

CROSS-REFERENCE TO RELATED APPLICATION

This application claims priority from Korean Patent Application No. 10-2016-0159293 filed on Nov. 28, 2016, in the Korean Intellectual Property Office, the disclosure of which is incorporated herein by reference in its entirety.

BACKGROUND

1. Field

Methods and apparatuses consistent with example embodiments relate to technology for processing a convolution operation.

2. Description of the Related Art

Neural network-based deep learning technology is widely used in various fields of art. For example, a deep learning-based biometric recognition and verification application that is used to recognize, for example, a face, an iris, and a voice, may be used in a terminal such as a smartphone. A convolutional neural network (CNN), which refers to a multilayer neural network using a convolution operation, may be effective in a field of deep learning-based image and voice recognition. Thus, there exists a need for advancement in technology for effectively processing an operation associated with a convolution.

SUMMARY

Example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a convolution processing apparatus including a controller configured to load a pixel of an input image and skip a process associated with the loaded pixel in response to a value of the pixel being 0, a filter bank including at least one filter and configured to extract at least one kernel element corresponding to the pixel from the at least one filter based on an index of the pixel and an input channel of the pixel, and a multiplier-accumulator (MAC) configured to perform a convolution operation based on the value of the pixel and a value of the at least one kernel element and accumulatively store an operation result of the convolution operation, the operation result corresponding to an output image.

The convolution processing apparatus may further include a plurality of input registers corresponding to predefined pixel rows. The controller may update an input register of a pixel row corresponding to a row of the pixel in an input feature map to record a column of the pixel in the input feature map and the input channel, provide the pixel row and the input channel to the filter bank, and provide the value of the pixel to the MAC. The filter bank may provide the value of the at least one kernel element to the MAC.

The convolution processing apparatus may further include a register configured to record a max column. The at least one filter may include kernel maps. The controller may load a pixel that is subsequent to the pixel based on the column recorded in the input register and the max column. The max column may be defined based on a width of the kernel maps.

The convolution processing apparatus may further include a register configured to record a max column. The controller may compare the column recorded in the input register with the max column, load a subsequent pixel corresponding to the row of the pixel in an input feature map that is interleaved with the input feature map based on a result of the comparing, and update the input register to record a column of the subsequent pixel in the interleaved input feature map and an input channel of the interleaved input feature map.

The convolution processing apparatus may further include a register configured to record a max column. The controller may compare the column recorded in the input register with the max column, load a subsequent pixel corresponding to a row that is subsequent to the row of the pixel in an input feature map that is interleaved with the input feature map based on a result of the comparing, and update an input register of a pixel row corresponding to a row of the subsequent pixel in the interleaved input feature map to record a column of the subsequent pixel in the interleaved input feature map and an input channel of the interleaved input feature map.

The convolution processing apparatus may further include a register configured to record a max column. The controller may compare a column, which is recorded in an input register corresponding to a last pixel row among the input registers, with the max column, and update the register to record a max column greater than the max column based on a result of the comparing.

The convolution processing apparatus may further include a register configured to record a max column. The MAC may include output registers corresponding to rows and columns, and the MAC may update the output registers to record values of output pixels based on results of operations between values of pixels and values of kernel elements. The controller may compare a column, which is recorded in an input register corresponding to a last pixel row among the input registers, with the max column, and transmit a slide signal to the MAC based on a result of the comparing. In response to the slide signal, the MAC may complete updating of a portion of the output registers.

The input image may include input feature maps corresponding to input channels, and pixels corresponding respectively to rows of the input feature maps may be interleaved and the interleaved pixels may be recorded in a memory.

Values of sparsity maps (SMs) corresponding to the input feature maps may be interleaved by each row of the input feature maps, and the interleaved values of the SMs may be recorded in the memory. Values of non-zero value lists (NZVLs) corresponding to the input feature maps may be interleaved by each row of the input feature maps, and the interleaved values of the NZVLs may be recorded in the memory. An SM refers to a map indicating whether values of pixels of an input feature map are 0. An NZVL refers to a list of values not being 0 among values of pixels of an input feature map, and the values of the NZVLs may correspond to the input channels.

Initial addresses corresponding to NZVLs of respective rows of the input feature maps may be recorded in registers corresponding to the rows, and an initial address corresponding to the SMs may be recorded in a register corresponding to the SMs. The controller may load the pixel from the memory based on the initial addresses corresponding to the NZVLs and the initial address corresponding to the SMs.

The at least one filter may include kernel maps. The filter bank may provide, to the MAC, a value of a kernel element of at least one row corresponding to the pixel row from a kernel map corresponding to the input channel among kernel maps included in a filter corresponding to the MAC.

The at least one filter may include kernel maps. The MAC may include output registers corresponding to rows and columns. A number of the pixel rows may be defined based on a height of the kernel maps and a number of the rows.

The at least one filter may include kernel maps. The MAC may include output registers corresponding to rows and columns. A number of the columns may be defined based on a width of the kernel maps. The MAC may update an output register to record a value of an output pixel based on a result of an operation between the value of the pixel and the value of the at least one kernel element.

The convolution processing apparatus may further include an output buffer including buffer elements corresponding to rows and columns. A number of the rows of the output buffer may be defined based on a number of the rows of the output registers. The columns of the output buffer may correspond to the MAC. The MAC may provide values of output pixels recorded in each row of output registers of a column for which updating is completed to each row of buffer elements of a column corresponding to the MAC.

The convolution processing apparatus may further include at least one pooling block corresponding to the MAC and an output buffer including buffer elements corresponding to rows and columns. The columns of the output buffer may correspond to the MAC. The MAC may provide values of output pixels recorded in output registers of a column for which updating is completed to the pooling block corresponding to the MAC. The pooling block may calculate a value of a new output pixel based on a value of an output pixel recorded in a buffer element of a column corresponding to the MAC and the provided values of the output pixels, and provide the value of the new output pixel to the buffer element.

The convolution processing apparatus may further include a plurality of input registers corresponding to predefined pixel rows. The controller may load a first pixel corresponding to a first input channel and a second pixel corresponding to a second input channel, update an input register of a first pixel row corresponding to a row of the first pixel to record a column of the first pixel and the first input channel, update an input register of a second pixel row corresponding to a row of the second pixel to record a column of the second pixel and the second input channel, provide the first pixel row and the first input channel to the filter bank, provide the second pixel row and the second input channel to the filter bank, provide a value of the first pixel to a first MAC, and provide a value of the second pixel to a second MAC. The filter bank may provide, to the first MAC, a value of a kernel element of at least one row corresponding to the first pixel row from a kernel map corresponding to the first input channel and provide, to the second MAC, a value of a kernel element of at least one row corresponding to the second pixel row from a kernel map corresponding to the second input channel.

The at least one filter may correspond to at least one output channel of the output image. The MAC may include output registers corresponding to rows and columns. A number of the columns may be defined based on a width of kernel maps. The filter bank may extract at least one first kernel element corresponding to the pixel from a first filter and extract at least one second kernel element corresponding to the pixel from a second filter, based on the index of the pixel and the input channel of the pixel. The MAC may update a first output register corresponding to the first filter to record a first value of an output pixel based on a first result of a first operation between the value of the pixel and a first value of the first kernel element, and update a second output register corresponding to the second filter to record a second value of an output pixel based on a second result of a second operation between the value of the pixel and a second value of the second kernel element.

According to an aspect of another example embodiment, there is provided a convolution processing method including loading, by a controller, a pixel of an input image including input feature maps corresponding to input channels; skipping, by the controller, a process associated with the loaded pixel in response to a value of the pixel being 0; extracting, by a filter bank, at least one kernel element corresponding to the pixel from at least one filter of the filter bank based on an index of the pixel and an input channel of the pixel; and performing, by an MAC, a convolution operation based on the value of the pixel and a value of the at least one kernel element, and accumulatively storing an operation result of the convolution operation. The operation result may correspond to an output image. Here, an input feature map may include pixels.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
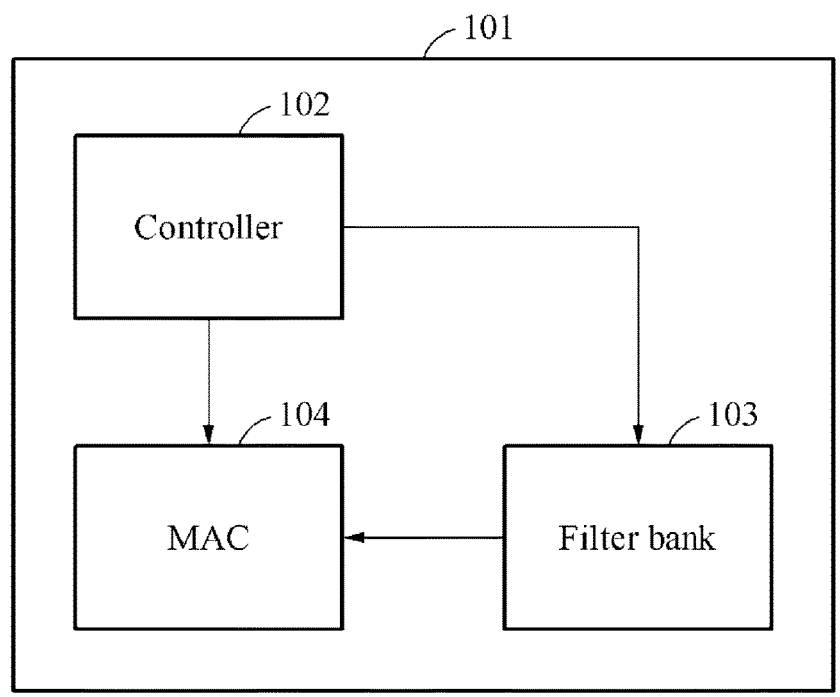
FIG. 1 is a diagram illustrating a configuration of a convolution processing apparatus according to an example embodiment.

Example embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

In addition, the terms such as "unit," "-er (-or)," and "module" described in the specification refer to an element for performing at least one function or operation, and may be implemented in hardware (e.g., by one or more processors), software, or the combination of hardware and software.

In the following description, like drawing reference numerals are used for like elements, even in different drawings. Various alterations and modifications may be made to the example embodiments, some of which will be illustrated in detail in the drawings and detailed description. The matters defined in the description, such as detailed construction and elements, are provided to assist in a comprehensive understanding of the example embodiments. However, it should be understood that these embodiments are not construed as limited to the illustrated forms and include all changes, equivalents or alternatives within the idea and the technical scope of this disclosure. It is apparent that the example embodiments can be practiced without those specifically defined matters. Also, well-known functions or constructions are not described in detail since they would obscure the description with unnecessary detail.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 is a diagram illustrating a configuration of a convolution processing apparatus according to an example embodiment.

Referring to FIG. 1, a convolution processing apparatus 101 may include a controller 102, a filter bank 103, and a multiplier-accumulator (MAC) 104. The convolution processing apparatus 101 refers to an apparatus for processing a convolution, and may be embodied by a software module, a hardware module, or a combination thereof.

In machine learning, a convolutional neural network (CNN), which is a type of a neural network, includes a plurality of convolution layers designed to perform a convolution operation. A convolution layer included in the CNN may perform a convolution operation associated with an input using a kernel. For example, the convolution processing apparatus 101 may generate or process operations, calculations, and instructions associated with a convolution, and generate an output image by processing an input image that is input to a convolution layer included in the CNN. According to an example embodiment, the convolution processing apparatus 101 may include a processor and a memory. The memory may be a volatile memory or a nonvolatile memory configured to store a program in which a convolution processing method described herein is embodied. The processor (e.g., central processing unit) may execute the program stored in the memory, and control the convolution processing apparatus 101. Code of the program to be executed by the processor may be stored in the memory. The convolution processing apparatus 101 may be connected to an external device, such as a personal computer (PC) and/or a network, through an input and output device, and exchange data with the external device. According to an example embodiment, the convolution processing apparatus 101 may be provided in a CNN accelerator configured to process an operation or a computation associated with the CNN, a neural processing unit (NPU), or a vision processing unit (VPU), and control a corresponding processor. Although the convolution processing apparatus 101 is described herein with reference to the components illustrated in FIG. 1, the convolution processing apparatus 101 may employ various types of hardware, and thus the components of the convolution processing apparatus 101 are not limited to the illustrated components.

Referring to FIG. 1, the controller 102 may load a pixel included in an input image. The input image may include input feature maps corresponding to input channels, and an input feature map may include pixels. The pixel loaded by the controller 102 may be one of the pixels included in the input feature map. The input feature map may include the pixels corresponding to rows and columns. In a matrix or grid structure that is identified by rows and columns, a number of the rows and a number of the columns indicate a height and a width, respectively.

The controller 102 may load the pixel from the memory in which the input image is stored. The input feature maps included in the input image may be interleaved with one another and stored in the memory. An example illustrating a method of storing an input image or an output image will be described with reference to FIGS. 2A, 2B, and 3. The loading of the pixel by the controller 102 indicates reading, from the memory, data or information associated with the pixel stored in the memory. For example, the controller 102 may load a pixel from the memory and write to a register, values of the loaded pixel, an input channel of an input feature map including the pixel, and an index of the pixel (for example, a row or a column of the pixel) in the input feature map. The controller 102 may control a process or an operation associated with a convolution, while providing, to other components, the data or information written in the register.

The filter bank 103 may include at least one filter. A kernel may include at least one filter, and the filter may include kernel maps. The kernel maps may correspond respectively to the input feature maps or the input channels. A kernel map may include kernel elements corresponding to rows and columns. In addition, filters may correspond respectively to output feature maps or output channels of the output image. In a case that an input image includes input feature maps corresponding to ten input channels when processing a convolution operation, each filter may include ten kernel maps corresponding to the input channels. In such a case, when a kernel includes five filters corresponding to output channels, five output feature maps may be generated by results of operations between the input image and the five filters, and the output image may thus include the output feature maps corresponding to the five output channels.

The controller 102 may provide the index of the pixel and the input channel of the pixel to the filter bank 103, and provide the value of the pixel to the MAC 104. The filter bank 103 may extract at least one kernel element corresponding to the pixel from at least one filter based on the index of the pixel and the input channel of the pixel. The filter bank 103 may provide the extracted kernel element to the MAC 104.

The MAC 104 may perform a convolution operation based on the value of the pixel and a value of the kernel element, and accumulatively store an operation result for the output image. The MAC 103 may perform a multiplication operation with the value of the pixel provided by the controller 102 and the value of the kernel element provided by the filter bank 103, perform an addition operation with results of the multiplication operation, and update operation results so that the operation results are suitable for the output image. An operation of the convolution processing apparatus 101 will be described in more detail with reference to FIGS. 4 through 6. An example illustrating a method of effectively managing or storing data of an input image and an output image will also be described with reference to FIGS. 2A, 2B, and 3.

Figure 2A:
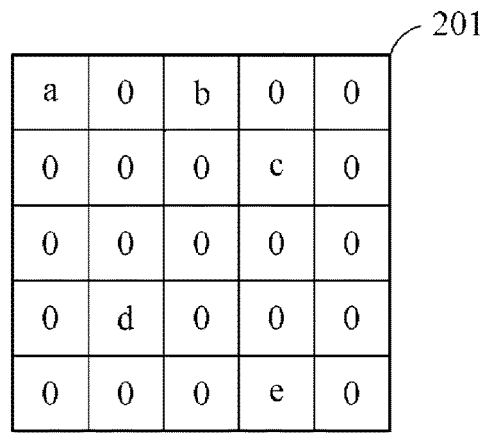
FIG. 2A is a diagram illustrating an example of an input feature map according to an example embodiment.

FIG. 2A is a diagram illustrating an example of an input feature map according to an example embodiment.

An input image may include input feature maps corresponding to input channels. Referring to FIG. 2A, an input feature map 201 includes pixels corresponding to rows and columns. A size, a width, and a height of the input feature map 201 are 5×5, 5, and 5, respectively. The input feature map 201 may be included in an output image to be output from a convolution layer among a plurality of convolution layers, and be included in an input image to be input to a subsequent convolution layer among the convolution layers. An input image, which is a target of a convolution processing apparatus according to an example embodiment, may be stored in a compressed form in a memory, and an output image generated by the convolution processing apparatus may also be stored in a compressed form in the memory. The convolution processing apparatus may compress the input image or the output image using a compression method, and store the compressed image in the memory. Alternatively, an apparatus independent from the convolution processing apparatus may compress the input image or the output image and store the compressed image in the memory, and the convolution processing apparatus may then load, from the memory, pixels to be used for a convolution process. Alternatively, the convolution processing apparatus may preprocess the input image, and perform a convolution process on pixels of the preprocessed input image. Here, technology to be applied to store the input image in the memory is referred to as the compression method, and the compression method may be performed by the convolution processing apparatus or the apparatus independent from the convolution processing apparatus. Hereinafter, an example illustrating the compression method used by the convolution processing apparatus will be described.

Figure 2B:
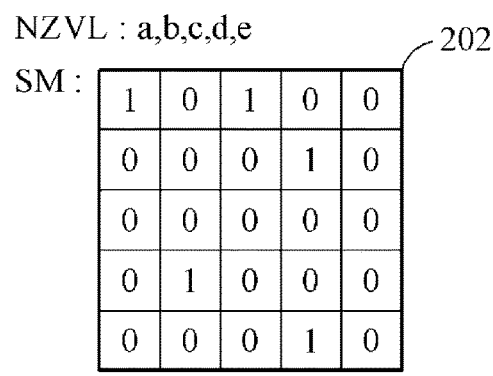
FIG. 2B is a diagram illustrating a method of processing an input image according to an example embodiment.

FIG. 2B is a diagram illustrating a method of processing an input image according to an example embodiment.

As shown in FIG. 2B, a convolution processing apparatus may generate a non-zero value list (NZVL) and a sparsity map (SM) 202 from the input feature map 201 illustrated in FIG. 2A. The SM 202 refers to a map indicating whether or not a value of a pixel in the input feature map 201 is zero. The convolution processing apparatus may generate the SM 202 through a binary mask indicating whether values of pixels in the input feature map 201 are zero. The binary mask of the SM 202 may be represented by Equation 1.

$$SM[i] = \begin{cases} 1, & \text{if Input}[i] \neq 0 \\ 0, & \text{otherwise} \end{cases} \quad \text{[Equation 1]}$$

In Equation 1, i denotes an index of a pixel. Input[i] and SM[i] denote a value of the pixel having the index i and a value of the pixel having the index i in an SM, respectively.

The NZVL refers to a list of values not being zero among the values of the pixels in the input feature map 201, and indicates a sequence of values corresponding to pixels being 1 in the SM 202. The convolution processing apparatus may compress a two-dimensional (2D) input image, for example, the input feature map 202, to be the NZVL and the SM 202. Using the SM 202, the convolution processing apparatus may rapidly calculate a position of a pixel of the input image and provide an address of a memory. A compression method according to an example embodiment may provide a gain of a memory requirement, when satisfying conditions of Equation 2.

$$S > \frac{1}{N} \quad \text{[Equation 2]}$$

In Equation 2, S denotes a sparsity of an input image, and N denotes a bit width of values of pixels of the input image. The sparsity refers to a ratio of the number of zero-valued pixels (0s) to the total number of pixels, and a range of the sparsity may be from 0 to 1.

Based on Equation 2, a threshold sparsity corresponding to a bit precision of each of different pieces of data may be indicated in Table 1 below. A data bit precision may correspond to the bit width.

TABLE 1

| Bit precision | Threshold sparsity |
|---|---|
| 8 | 12.5% |
| 12 | 8.33% |
| 16 | 6.25% |
| 24 | 4.16% |
| 32 | 3.12% |

Referring to Table 1, hardware using a 16 bit precision may obtain a gain when processing an input image having a sparsity of 6.25% or higher. Thus, the compression method may be used in most convolution layers. A size of bit widths of an image compressed through the compression method may be represented by Equation 3.

$$\text{compressed size} = E(1 + N - SN) \quad \text{[Equation 3]}$$

In Equation 3, compressed size denotes a size of bit widths of a compressed image. E, S, and N denote a number of pixels of an input image, a sparsity of the input image, and a bit width of values of pixels of the input image, respectively. S and N are the same as S and N in Equation 2. E is a size of bit widths of an SM and E×(1−S)×N is a size of bit widths of an NZVL, and thus Equation 3 may be derived therefrom. The convolution processing apparatus may compress a large-size input feature map to be an SM and an NZVL, and thus may compress a high-definition (HD) image to be a form suitable for a convolution process.

The compression method may reduce input/output (I/O) bandwidth requirements, provide simple hardware indexing, and reduce a computational overload generated during a convolution operation. Hardware that supports the compression method may be readily reused to compress an input image in an incompressible form, for example, a first convolution layer.

Figure 3:
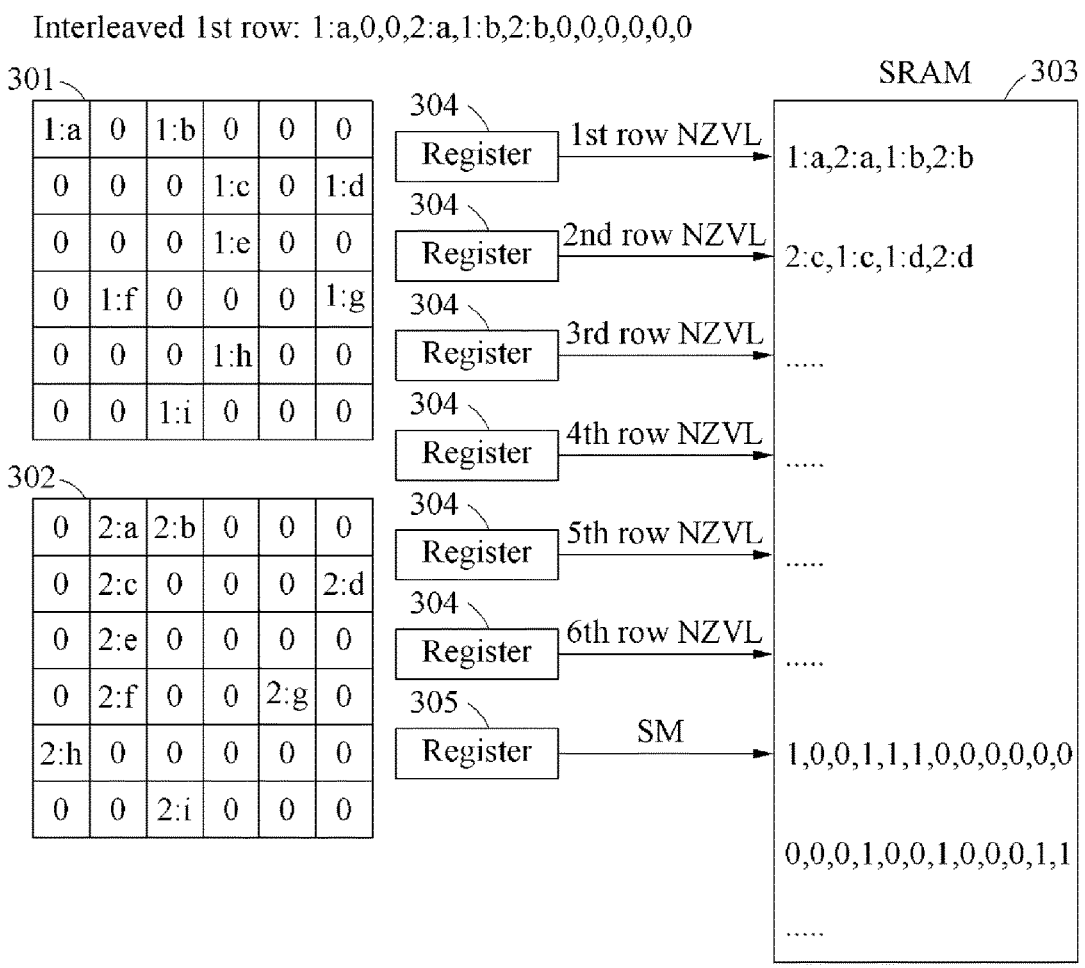
FIG. 3 is a diagram illustrating a method of storing an input image according to an example embodiment.

FIG. 3 is a diagram illustrating a method of storing an input image according to an example embodiment.

According to an example embodiment, a convolution processing apparatus may interleave input feature maps corresponding to input channels and store the interleaved input feature maps in a memory. For example, as illustrated in FIG. 3, the convolution processing apparatus may interleave pixels corresponding to respective rows of the input feature maps and store the interleaved pixels in the memory. Referring to FIG. 3, a first input feature map 301 corresponding to a first input channel and a second input feature map 302 corresponding to a second input channel are interleaved with each other to be stored in a static random-access memory (SRAM) 303. An SRAM described herein is a type of a memory, and various other types of memory may also be used.

Referring to FIG. 3, each of the first input feature map 301 and the second input feature map 302 includes pixels corresponding to six rows and six columns. "1:" and "2:" indicated along with values of the pixels indicate "corresponding to the first input channel" and "corresponding to the second input channel," respectively. The convolution processing apparatus interleaves the rows of the input feature maps 301 and 302, and stores sets of the interleaved rows in the SRAM 303. A set of an interleaved first row includes 1:a, 0, 0, 2:a, 1:b, 2:b, 0, 0, 0, 0, 0, 0. The convolution processing apparatus interleaves values of SMs corresponding to the input feature maps 301 and 302 by each row of the input feature maps 301 and 302, and stores the interleaved values, for example, 1, 0, 0, 1, 1, 1, 0, . . . as illustrated in FIG. 3, in the SRAM 303. The convolution processing apparatus interleaves values of NZVLs corresponding to the input feature maps 301 and 302 by each row of the input feature maps 301 and 302, and stores the interleaved values for each row in the SRAM 303.

According to an example embodiment, as illustrated in FIG. 3, the convolution processing apparatus records initial addresses corresponding to the NZVLs in registers 304 corresponding to rows of the interleaved and stored values of the NZVLs. The convolution processing apparatus records an initial address corresponding to the SMs in a register 305 corresponding to the interleaved and stored values of the SMs. The registers 304 and the register 305 may be separate components from the convolution processing apparatus, and the recording of the initial addresses may be performed by an apparatus independent from the convolution processing apparatus. According to an example embodiment, as illustrated in FIG. 3, the convolution processing apparatus may store an off-chip input image in the SRAM 303. In such a case, the registers 304 of which a number corresponds to a number of rows of an input feature map of the input image may record initial addresses of NZVLs of the rows. A size of an SM is invariable, and thus a single register configured to record the initial address of the SMs may be sufficient with the register 305. The convolution processing apparatus may readily calculate initial addresses of rows of the SMs using the initial address of the SMs.

As described above, the convolution processing apparatus may store, in a memory, input feature maps corresponding to input channels and an output image generated through a convolution process performed on an input image. The input image or the output image may be stored in the memory by an apparatus independent from the convolution processing apparatus, and the convolution processing apparatus may sequentially load pixels needed for a convolution operation from the memory. A compression method of storing the input image or the output image in a compressed form is described above. The compression method may be applied to a kernel, or filters. As described above, kernel maps of the filters may also be interleaved and stored, and registers described in the foregoing may be used. Hereinafter, an example illustrating a method of loading pixels stored in a memory (for example, the SRAM 303) and processing the loaded pixels by the convolution processing apparatus will be described in detail with reference to FIGS. 4 through 6.

Figure 4:
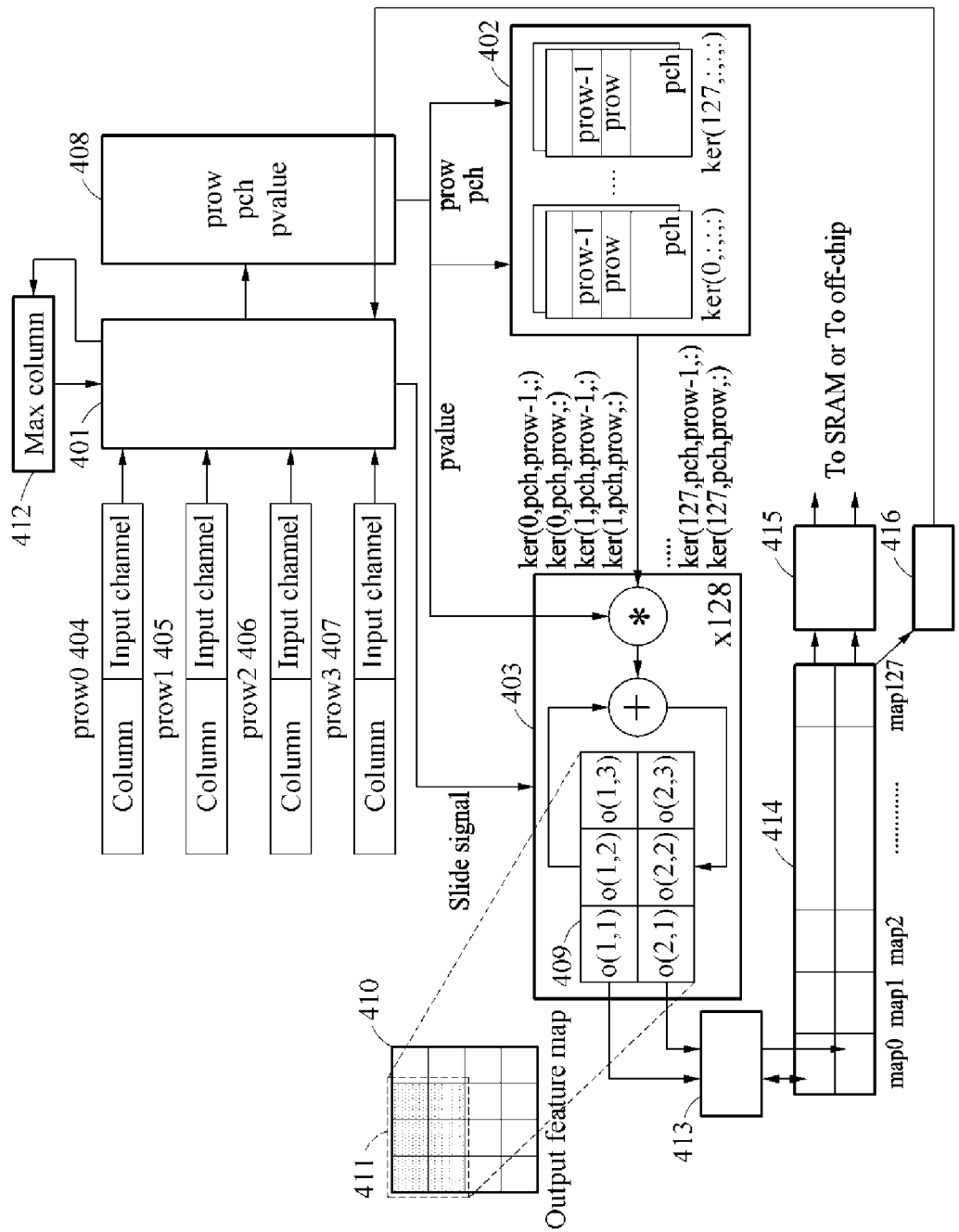
FIG. 4 is a diagram illustrating an operation of a convolution processing apparatus according to an example embodiment.

FIG. 4 is a diagram illustrating an operation of a convolution processing apparatus according to an example embodiment.

Referring to FIG. 4, a convolution processing apparatus may include a controller 401, a filter bank 402, an MAC 403, and an input register 404. Here, at least one MAC may be provided as the MAC 403, and a plurality of input registers may be provided as the input register 404 corresponding to predefined pixel rows. It is assumed herein that a number of filters included in a kernel is 128, a size of a kernel map included in a filter is 3×3, a width of the kernel map is 3, a height of the kernel map is 3, a number of MACs is 128, and a number of output channels of an output image is 128 because the number of the filters is 128. However, other numbers and sized may be used. The MACs may correspond respectively to the output channels, and thus process operations associated with respective output feature maps. Each of the MACs may include a multiplier and an adder, and output registers 409 to record operation results. The output registers 409 may correspond to rows and columns. As illustrated in FIG. 4, a number of the rows of the output registers 409 may be designed to be two to record operation results associated with two rows of an output feature map 410. The MAC 403 updates the output registers 409 to record values of output pixels (for example, o(1, 1), o(2, 1), o(1, 2), o(2, 2), o(1, 3), and o(2, 3)) based on results of operations between values of pixels and values of kernel elements.

An output buffer 414 includes buffer elements corresponding to rows and columns. When updating a portion of the output registers 409 is completed, the MAC 403 provides, to buffer elements associated with an output channel corresponding to the MAC 403, values of output pixels recorded in the output registers among the output registers 409 for which the updating is completed.

To generate values of output pixels associated with the two rows of the output feature map 410, values of pixels of four rows of an input feature map may be needed. When a certain row of an input feature map is loaded from a memory, the convolution processing apparatus uses four input registers, for example, the input register 404, an input register 405, an input register 406, and an input register 407 to track a position of a loaded non-zero value. The convolution processing apparatus updates the input registers 404, 405, 406, and 407 based on a value of an SM and records, in the input registers 404, 405, 406, and 407, a column and an input channel of a pixel loaded from the memory. Hereinafter, an example illustrating an operation of each component in a case that one pixel is loaded will be described in detail with reference to FIG. 4.

The controller 401 loads one pixel from an input image including input feature maps corresponding to input channels. Here, an input feature map may include pixels. The controller 401 updates an input register of a pixel row corresponding to a row of the pixel in an input feature map to record a column of the pixel in the input feature map and an input channel of the pixel. Here, a row of a pixel indicates a row of the pixel in an input feature map, and a pixel row indicates an index identifying an input register, for example, the input registers 404, 405, 406, and 407. The pixel row is illustrated herein as a prow. A prow refers to a relative position in a set of rows of pixels currently read from the memory. As illustrated in FIG. 4, a pixel row or a prow may include prow0, prow1, prow2, and prow3. For example, in a case that a pixel row or a prow corresponding to the row of the loaded pixel is prow0, the controller 401 records the column and the input channel of the loaded pixel in the input register 404 corresponding to prow0. A number of pixel rows may be defined based on a height of kernel maps and a number of the rows of the output registers 409. For example, in a case that the number of the rows of the output registers 409 is two and the height of the kernel maps is 1, the number of the pixel rows may be set to be a sum of the height of the kernel maps and a value obtained by subtracting 1 from the number of the rows of the output registers 409 (i.e., the number of the rows of the output registers 409−1).

The controller 401 provides, to the filter bank 402, the pixel row (or a prow as illustrated) of the updated input register and the input channel (or a pch as illustrated) of the loaded pixel and provides, to the MAC 403, a value of the pixel (or a pvalue as illustrated). Here, a pixel may be defined by a pixel row (prow), a column, an input channel (pch), and a value of the pixel (pvalue). To load the pixel, and provide the prow, the pch, and the pvalue to the filter bank 402 and the MAC 403, the controller 401 records the prow, the pch, and the pvalue in a register 408.

The filter bank 402 provides, to the MAC 403, values of kernel elements of rows corresponding to the prow from a kernel map corresponding to the pch among kernel maps included in a filter corresponding to the MAC 403. Referring to FIG. 4, the MAC 403 processes an operation associated with the two rows of the output feature map 410, and thus the rows of the kernel elements corresponding to the prow may be a prow−1 and the prow. In such a case, the filter bank 402 may provide, to the MAC 403, values of kernel elements of the prow−1 and the prow. Here, the MACs correspond to output channels, and thus the filter bank 402 may provide, to each of the MACs, the values of the kernel elements of the prow−1 and the prow included in each filter. The kernel elements of the prow−1 and the prow extracted from kernel maps corresponding to the pch among kernel maps included in a zeroth filter are illustrated as ker(0, pch, prow−1, :) and ker(0, pch, prow, :).

A number of columns of output registers included in the MAC 403 may be defined based on a width of kernel maps. As shown in FIG. 4, the number of the columns of the output registers may be designed to be 3, which is the width of the kernel maps. However, the number of the columns of the output registers may be set differently based on specifications of hardware. The MAC 403 may receive one pixel value (pvalue) at a time, and all the MACs may receive the same pixel value (pvalue).

As illustrated in FIG. 4, in a case that the MAC 403 corresponds to a zeroth output channel, the MAC 403 receives, from the zeroth filter, the extracted ker(0, pch, prow−1, :) and ker(0, pch, prow, :). The MAC 403 updates the output registers 409 to record values of output pixels based on a result of an operation between the pvalue and ker(0, pch, prow−1, :) and a result of an operation between the pvalue and ker(0, pch, prow, :). The MAC 403 multiplies the pvalue and kernel elements requiring a convolution operation, and updates the output registers 409 based on results of the multiplication. For example, the MAC 403 may multiply the pvalue and values of kernel elements of a size of 2×3, and update the output registers 409 of a size of 2×3 based on results of the multiplication.

The output registers 409 of the size of 2×3 may record values of output pixels corresponding to output pixels 411 of the output feature map 410, for example, o(1, 1), o(2, 1), o(1, 2), o(2, 2), o(1, 3), and o(2, 3). As described above, the filter bank 402 may provide, to the MAC 403, the kernel elements corresponding to the two rows in the output feature map 410 based on the prow and the pch. In a case of border pixels, for example, pixels corresponding to prow0, prow1, or border columns, kernel elements of a single row may be needed for a kernel operation. Thus, the filter bank 402 may provide, to the MAC 403, the kernel elements of the single row based on prow0 or prow1. When processing an operation associated with the border pixels, the MAC 403 may perform a multiplication operation by a number of times less than 2×3. When processing an operation associated with non-border pixels, the MAC 403 may multiply the pvalue and the values of the kernel elements of the size of 2×3. All the MACs may need a number of cycles, or an ncycles(x, y), to update output registers using a pixel at a position (x, y) corresponding to row x and column y. For the non-border pixels, the MAC 403 may need 2×3 cycles to update the output registers.

As shown in FIG. 4, the convolution processing apparatus includes a register 412 configured to record a max column, or in which a max column is recorded. The controller 401 loads a subsequent pixel, which is a pixel subsequent to the loaded pixel, based on the max column and the column recorded in the input register. The max column may be defined based on the width of the kernel maps, and may be set to be, for example, the width of the kernel maps. The controller 401 provides, to the filter bank 402 and the MAC 403, information associated with the pixel and waits for the ncycles(x, y) needed for the MAC 403 to process an operation associated the pixel. The controller 401 loads the subsequent pixel after the ncycles(x, y).

According to an example embodiment, the controller 401 compares the column recorded in the input register and the max column, and loads the subsequent pixel corresponding to the row of the currently loaded pixel in an input feature map interleaved with the input feature map including the currently loaded pixel based on a result of the comparing.

The controller 401 loading the subsequent pixel updates an input register corresponding to a row of the subsequent pixel to record a column of the subsequent pixel in the interleaved input feature map and an input channel of the interleaved input feature map. Since a pixel corresponding to a column greater than the max column in an input feature map does not contribute to values of leftmost output pixels o(1, 1) and o(2, 1) of the output registers 409 of the MAC 403, the controller 401 may load a pixel of a subsequent row when the column of the loaded pixel reaches the max column. In a case that an input image is stored as illustrated in FIG. 3, the controller 401 loads a pixel of (1, 2) in the input feature map 302. Here, a value of the pixel is "a." The controller 401 records, in the input register 404 of prow0, column 2 and input channel 2. The controller 401 waits for the ncycles(x, y) needed to process the operation associated with the currently loaded pixel, and loads a subsequent pixel corresponding to row 1 of the currently loaded pixel because column 2 recorded in the input register 404 is less than the max column, for example, column 3. The controller 401 loads the subsequent pixel of (1, 3) in the interleaved input feature map 301. Here, a value of the pixel is "b." The controller 401 updates the input register 404 corresponding to a row of the subsequent pixel to record column 3 and input channel 1 of the subsequent pixel.

According to an example embodiment, the controller 401 may compare a column recorded in an input register to a max column, and load a subsequent pixel corresponding to a subsequent row of a currently loaded pixel in an input feature map interleaved with an input feature map based on a result of the comparing. For example, in a case that the column recorded in the input register reaches the max column, the controller 401 may load the subsequent pixel corresponding to the subsequent row, which is a row subsequent to a row of the currently loaded pixel. The controller 401 loading the subsequent pixel may update an input register of a pixel row corresponding to a row of the subsequent pixel to record a column of the subsequent pixel in the interleaved input feature map and an input channel of the interleaved input feature map. In a case that an input image is stored as illustrated in FIG. 3, the controller 401 loads a pixel, for example, a pixel of (1, 3) in the input feature map 302. Here, a value of the pixel is "b." The controller 401 records column 3 and input channel 2 in the input register 404 of prow0. The controller 401 waits for ncycles(x,y) needed for processing an operation associated with the currently loaded pixel, and loads a subsequent pixel corresponding to a row subsequent to row 1 of the currently loaded pixel because column 3 recorded in the input register 404 is the max column (for example, column 3). The controller 401 loads the subsequent pixel of (2, 1) in the interleaved input feature map 301. Here, a value of the pixel is 0. Although the controller 401 updates the input register 404 corresponding to the row of the subsequent pixel to record column 1 and input channel 1 of the subsequent pixel, the controller 401 may skip a process, an operation, or an instruction associated with the subsequent pixel because the value of the subsequent pixel is 0. Thus, the controller 401 may skip the process associated with the subsequent pixel having the value of 0, and load a subsequent pixel. Alternatively, in a case that a value of a sparsity map recorded in the memory is 0, the controller 401 may skip loading of a corresponding pixel.

According to an example embodiment, the controller 401 may compare a column recorded in the input register 407 corresponding to a last pixel row, or prow3, among the input registers 404, 405, 406, and 407, to a max column, and update the register 412 to record a max column greater than the max column based on a result of the comparison. For example, when the column recorded in the input register 407 reaches the max column, the controller 401 may update the register 412 by increasing the max column by one. The controller 401 may update max column 3 recorded in the input register 407 to be max column 4. In a case that column 3 is recorded in the input register 407 updated by a loaded pixel, the controller 401 may update the register 412 because column 3 recorded in the input register 407 reaches max column 3. The controller 401 may load a subsequent pixel corresponding to a column greater than the increased max column, for example, column 4.

According to an example embodiment, as illustrated in FIG. 4, the convolution processing apparatus includes the output buffer 414. The output buffer 414 includes buffer elements corresponding to rows and columns. A number of the rows of the output buffer 414 may be defined based on the number of the rows of the output registers 409. For example, the number of the rows of the output buffer 414 may be designed to be the same as the number of the rows of the output registers 409. The columns of the output buffer 414 may correspond respectively to the MACs. Each of the columns of the output buffer 414 may correspond to each output channel. For example, 128 MACs may provide values of output pixels to buffer elements corresponding respectively to 128 output channels. Here, the buffer elements may correspond to output feature maps. The convolution processing apparatus may generate an output image using the output feature maps corresponding to the 128 output channels.

According to an example element, the MAC 403 may provide values of output pixels recorded in rows of output registers of a column for which updating is completed to respective rows of buffer elements of a column corresponding to the MAC 403. For example, as illustrated in FIG. 4, in a case that the MAC 403 corresponds to an output feature map, or map0, and output registers of a first column among the output registers 409 are updated, the MAC 403 may provide values of output pixels, for example, o(1, 1) and o(2, 1), to rows of buffer elements of a column corresponding to map0. Similarly, buffer elements of columns corresponding to map0, map1, . . . , map127 may store values of output pixels provided by the MACs.

According to an example element, the controller 401 may compare, to a max column, a column recorded in the input register 407 corresponding to prow3, which is a last pixel row, among the input registers 404, 405, 406, and 407, and transmit a slide signal to the MAC 403 based on a result of the comparison. In response to the slide signal, the MAC 403 may update a portion of the output registers 409. For example, as illustrated in FIG. 4, in a case that a column recorded in the input register 407 corresponding to prow3 reaches the max column, for example, a width of a kernel map, the controller 401 may transmit the slide signal to the MAC 403. The MAC 403 may complete updating of registers of a leftmost column among the output registers 409, for example, registers corresponding to o(1, 1) and o(2, 1). Here, the completion of updating of an output register indicates that an operation associated with a corresponding output channel is completed so that a value of an output pixel recorded in a corresponding output register is sent out of the MAC 403 to, for example, the output buffer 414 or a pooling block 413. The MAC 403 may provide values of output pixels recorded in the registers corresponding to o(1, 1) and o(2, 1) to the output buffer 414 or the pooling block 413, and moves values of o(1, 2), o(2, 2), o(1, 3), and o(2, 3) to a left column, for example, o(i; j)←o(i; j+1). The MAC 403 may record 0 in output registers corresponding to o(1, 3) and o(2, 3). In response to the slide signal, the convolution processing apparatus may process an operation of sliding a kernel map in an input feature map and filtering values of pixels.

The convolution processing apparatus may include pooling blocks corresponding to the MACs. Although not illustrated, in a case that a number of output channels is 128, a number of the pooling blocks may be 128. The MAC 403 feeds, to the pooling block 413 corresponding to the MAC 403, values of output pixels recorded in output registers of a column for which updating is completed. The pooling block 413 calculates a value of a new output pixel based on a value of an output pixel recorded in a buffer element of a column corresponding to the MAC 403 and the values of the output pixels fed by the MAC 403. The pooling block 413 feeds the value of the new output pixel to the buffer element of the column corresponding to the MAC 403. For example, the MAC 403 feeds, to the pooling block 413, the values of the output pixels recorded in the registers corresponding to o(1, 1) and o(2, 1) for which updating is completed. In a case that the MAC 403 corresponds to the output feature map, map0, the pooling block 413 determines, to be the value of the new output pixel, a greatest value among the value of the output pixel recorded in the buffer element of the column corresponding to map0, for example, a buffer element of a first row among buffer elements of the column corresponding to map0, and values of o(1, 1) and o(2, 1). Here, the value of the output pixel recorded in the buffer element of the column corresponding to map0 may be a greatest value among values of output pixels previously provided to the pooling block 413. The pooling block 413 may provide the value of the new output pixel to the buffer element of the column corresponding to map0, for example, the buffer element of the first row among the buffer elements of the column corresponding to map0. When the pooling block 413 is used in such a manner, only buffer elements of a single row among buffer elements may be used. After a value previously recorded in the buffer element is updated with the value provided by the pooling block 413, the output buffer 414 may then provide the updated value recorded in the buffer element to an outside (e.g., an encoder 415). The pooling block 413 may be omitted. In such a case, values of output pixels recorded in the output registers 409 may be provided to each row of the output buffer 414.

The encoder 415 compresses output feature maps based on the values of the output pixels fed by the output buffer 414. The encoder 415 feeds, to an SRAM or an off-chip, an output image compressed using a compression method described with reference to FIGS. 2A and 2B and 3. The compressed output image may then be fed as an input image to a subsequent convolution layer from the SRAM, or streamed through an off-chip method.

Referring to FIG. 4, the convolution processing apparatus also includes a buffer monitor block 416. When buffer elements of the output buffer 414 are not empty, the buffer monitor block 416 transmits a halt signal to the controller 401. In response to the halt signal, the controller 401 suspends an operation of transmitting the slide signal. For example, buffer elements may need to be empty to move values of output pixels recorded in the output registers 409, and thus the controller 401 may continue waiting in response to the halt signal, and transmit the slide signal when the halt signal is not transmitted.

Figure 5:
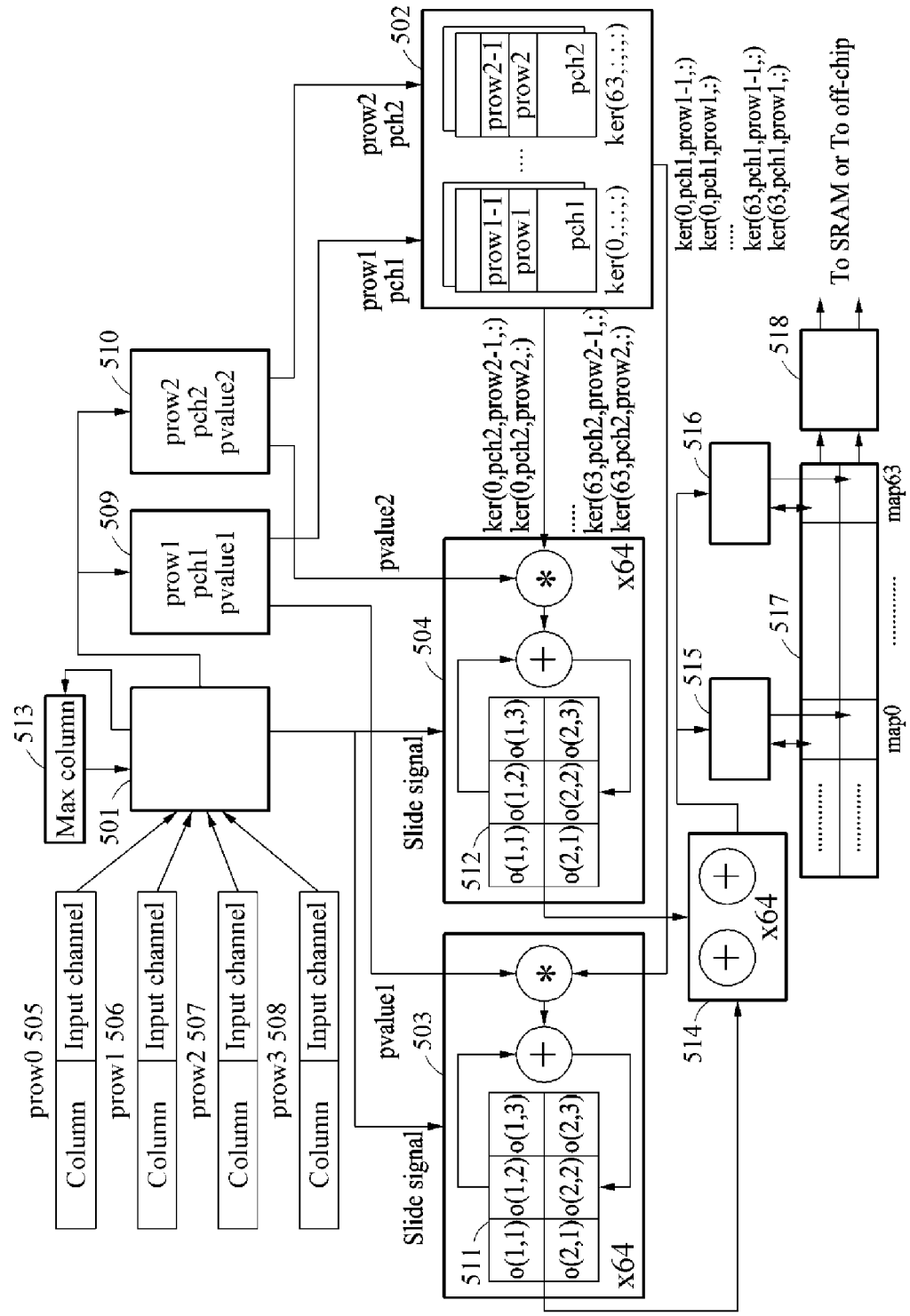
FIG. 5 is a diagram illustrating an operation of a convolution processing apparatus according to another example embodiment.

FIG. 5 is a diagram illustrating an operation of a convolution processing apparatus according to another example embodiment.

Referring to FIG. 5, a convolution processing apparatus may process a convolution operation associated with partial sums of an output feature map using multiple MACs, for example, a first MAC 503 and a second MAC 504. In FIG. 4, a number of output feature maps is assumed to be 128. Hereinafter, in a case that a number of output feature maps is 64, an example of how partial sums of the 64 output feature maps are calculated by first 64 MACs, for example, the first MAC 503, and remaining second 64 MACs, for example, the second MAC 504, among 128 MACs will be described. Each output feature map may be generated based on operation results by the first MAC 503 and the second MAC 504. Since a number of output channels is 64, buffer elements of each column of an output buffer 517 may correspond respectively to the output feature maps.

As shown in FIG. 5, the convolution processing apparatus may include a controller 501, a filter bank 502, the first MAC 503, and the second MAC 504. The convolution processing apparatus also includes input registers 505, 506, 507, and 508 corresponding to predefined pixel rows, for example, prow0, prow1, prow2, and prow3, and a register 513 recording a max column. Here, the description provided with reference to FIG. 4 may be applicable to an example related to input registers and a register recording a max column.

As illustrated in FIG. 5, the controller 501 may load a first pixel corresponding to a first input channel and a second pixel corresponding to a second input channel. The controller 501 may update an input register of a first pixel row corresponding to a row of the first pixel to record a column of the first pixel and the first input channel. The controller 501 may update an input register of a second pixel row corresponding to a row of the second pixel to record a column of the second pixel and the second input channel. Here, the first pixel row, a value of the first pixel, and the first input channel are indicated as prow1, pvalue1, and pch1, respectively. Similarly, the second pixel row, a value of the second pixel, and the second input channel are indicated as prow2, pvalue2, and pch2, respectively. Since the second pixel row is prow2, the row of the second pixel may be a row subsequent to the row of the first pixel. In a case that the row of the second pixel and the row of the first pixel are the same, the controller 501 may update a same input register in response to the loading of the first pixel and the second pixel.

The controller 501 may provide prow1 and pch1 to the filter bank 502, and pvalue1 to the first MAC 503. The controller 501 may provide prow2 and pch2 to the filter bank 502, and pvalue2 to the second MAC 504. The controller 501 may record prow1, pch1, and pvalue1 in a register 509 to load the first pixel and provide prow1, pch1, and pvalue1 to the filter bank 502 and the first MAC 503. Similarly, the controller 501 may record prow2, pch2, and pvalue2 in a register 510 to load the second pixel and provide prow2, pch2, and pvalue2 to the filter bank 502 and the second MAC 504.

The filter bank 502 may provide, to the first MAC 503, a value of a kernel element of at least one row corresponding to prow1 from a kernel map corresponding to pch1, for example, kernel elements corresponding to prow1−1 and prow1. The filter bank 502 may extract values of kernel elements from filters corresponding to the 64 output channels, and provide the extracted values to the 64 first MACs. Similarly, the filter bank 502 may provide, to the second MAC 504, a value of a kernel element of at least one row corresponding to prow2 from a kernel map corresponding to pch2, for example, kernel elements corresponding to prow2−1 and prow2. The filter bank 502 may extract values of kernel elements from filters corresponding to the 64 output channels, and provide the extracted values to the 64 second MACs.

The first MAC 503 may include output registers 511 corresponding to rows and columns, and the second MAC 504 may include output registers 512 corresponding to rows and columns. The descriptions provided above may be applicable to an example of designing such output registers. The first MAC 503 and the second MAC 504 may update the output registers 511 and 512 to record values of output pixels corresponding to a same output feature map. The first MAC 503 and the second MAC 504 may provide, to an operator 514, values of the output pixels for which updating is completed. The operator 514 may correspond to output channels. The operator 514 may generate a result of an operation among values of output pixels provided by the first MAC 503 and the second MAC 504 (for example, a sum of the values of the output pixels) and provide the generated result to a buffer element corresponding to a corresponding output channel.

The controller 501 may transmit a slide signal to the first MAC 503 and the second MAC 504. In response to the slide signal, the first MAC 503 and the second MAC 504 may complete updating a portion of the output registers 511 and 512 and provide values of output pixels recorded in output registers for which the updating is completed to an outside (for example, an output buffer 517) or a pooling block (e.g., a pooling block 515 and a pooling block 516). The example described above may be applicable to operations associated with the slide signal.

The convolution processing apparatus also includes the pooling blocks 515 and 516 corresponding to output channels, and the output buffer 517. The operations result provided by the operator 514 is recorded in the output buffer 517 through the pooling blocks 515 and 516. Depending on the design of the convolution processing apparatus, the convolution processing apparatus may not include the pooling blocks 515 and 516. In such a case, the operation result provided by the operator 514 may be immediately recorded in the output buffer 517. The example described with reference to FIG. 4 may be applicable to an example of recording values of output pixels in the output buffer 517. An encoder 518 compresses output feature maps based on the values of the output pixels provided by the output buffer 517, and a compression method described above may be used for the compressing.

A method using multiple MACs may also be applied to a case in which an output image includes 32 or 16 output feature maps. In a case that a number of output feature maps is 16, a controller may load eight pixels, and record prow1 through prow8, pch1 through pch8, and pvalue1 through pvalue8 in eight respective registers, and control eight sets of MACs. The eight sets of the MACs may include 16 first MACs through 16 eighth MACs. Since an MAC may use 2×(a width of a kernel map)×(a size of output registers) cycles to process a pixel, the MAC may maintain an idle state during a portion of the cycles in a case that a value of 2×(a width of a kernel map)×(a size of output registers) is less than eight. In such a case, the portion of the MACs may be switched off, and the output feature maps may be generated by a reduced number of MACs.

Figure 6:
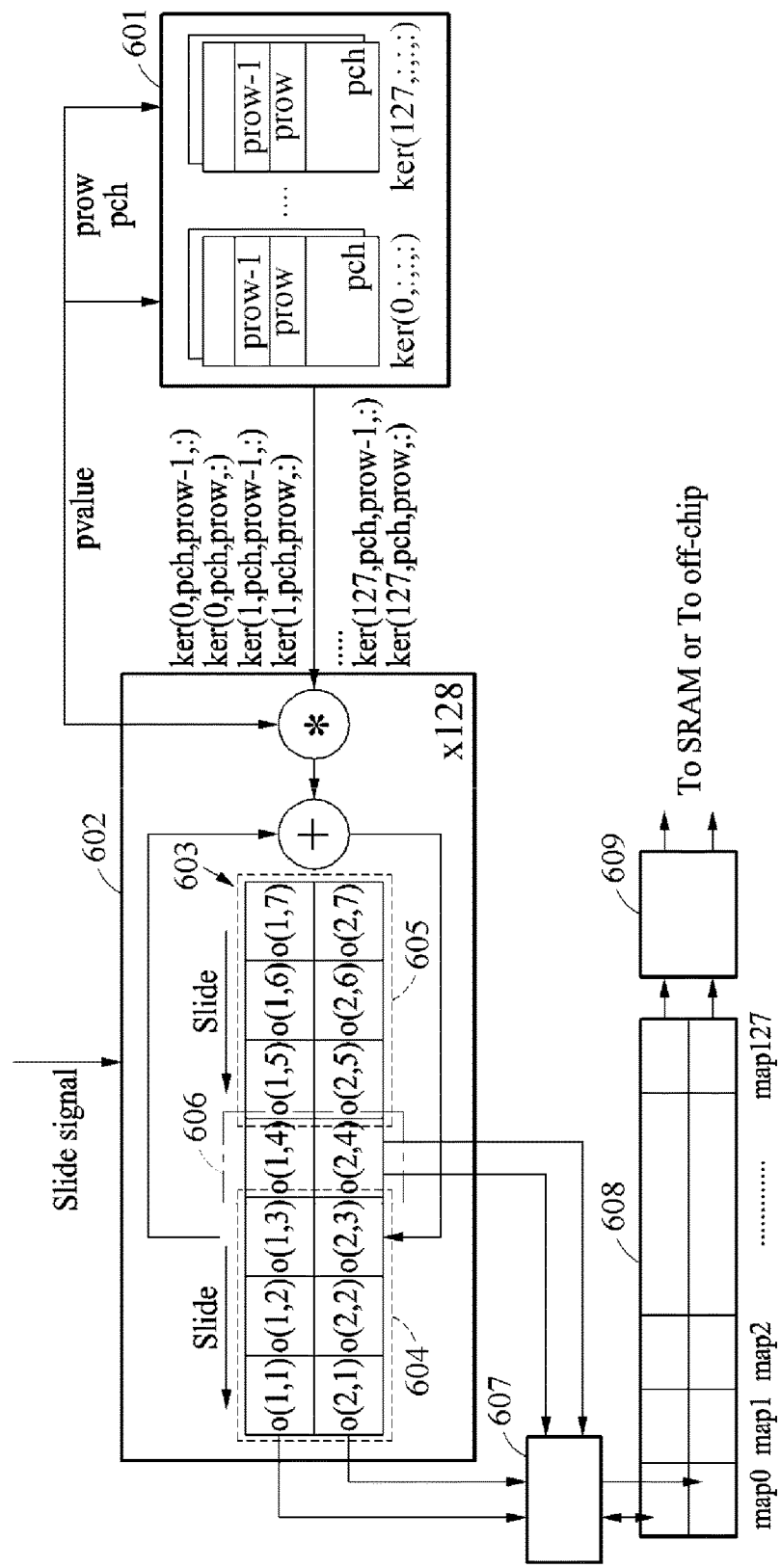
FIG. 6 is a diagram illustrating an operation of a convolution processing apparatus according to still another example embodiment.

FIG. 6 is a diagram illustrating an operation of a convolution processing apparatus according to another example embodiment.

As shown in FIG. 6, a convolution processing apparatus may process a convolution operation using MACs configured to process multiple output feature maps (for example, two output feature maps). The MACs may correspond to output channels. As illustrated in FIG. 6, an MAC 602 may include output registers 603 corresponding to rows and columns, and a number of the columns may be defined based on a width of kernel maps. A number of the columns of the output registers 603 may be defined to be a value of (the width of the kernel maps)×2+1. The number of the columns of the output registers 603 is illustrated as seven in the example embodiment of FIG. 6.

A controller of the convolution processing apparatus may load a pixel, and provide a prow and a pch corresponding to the loaded pixel to a filter bank 601 and provide a pvalue to the MAC 602. The filter bank 601 may extract first kernel elements from a first filter and second kernel elements from a second filter based on the prow and the pch. The first kernel elements and the second kernel elements may be extracted from different filters, and thus correspond to different output feature maps, or different output channels. The filter bank 601 may provide the first kernel elements and the second kernel elements to the MAC 602.

The MAC 602 may update output registers 604 corresponding to the first filter to record values of output pixels based on results of operations between the pvalue and the first kernel elements. Similarly, the MAC 602 may update the output registers 603 corresponding to the second filter to record values of output pixels based on results of operations between the pvalue and the second kernel elements. Thus, the MAC 602 may process convolution operations corresponding to the different output channels. In a case that a size of a kernel map is 3×3, the MAC 602 may record values of output pixels of the different output feature maps in the output registers 603 of a same row using the output registers 603 corresponding to seven columns. In FIG. 6, the output registers 604 may correspond to a first output feature map, and the output registers 603 may correspond to a second output feature map. The output registers 603 may include output registers 606 configured to separate the output registers 603 from the output registers 604. The output registers 606 may be embodied by a single column.

As illustrated in FIG. 6, the MAC 602 may provide values of output pixels, for example, o(1, 1) and o(2, 1), recorded in output registers for which updating is completed to an outside (for example, an output buffer 608 and a pooling block 607). When the values of the pixels o(1, 1) and o(2, 1) are provided to an external component, the MAC 602 may move values of output pixels recorded in the output registers 603 to left columns, for example, o(i, j)←o(i, j+1). In such a case, values of output pixels, for example, o(1, 5) and o(2, 5), recorded in output registers for which updating is completed may be recorded in the output registers 606, and the MAC 602 may provide the values of the output pixels recorded in the output registers 606 to an outside (for example, the output buffer 608 and the pooling block 607). Here, the output registers 606 may function as a temporary storage. Descriptions provided above may be applicable to the pooling block 607, the output buffer 608, and an encoder 609.

Figure 7:
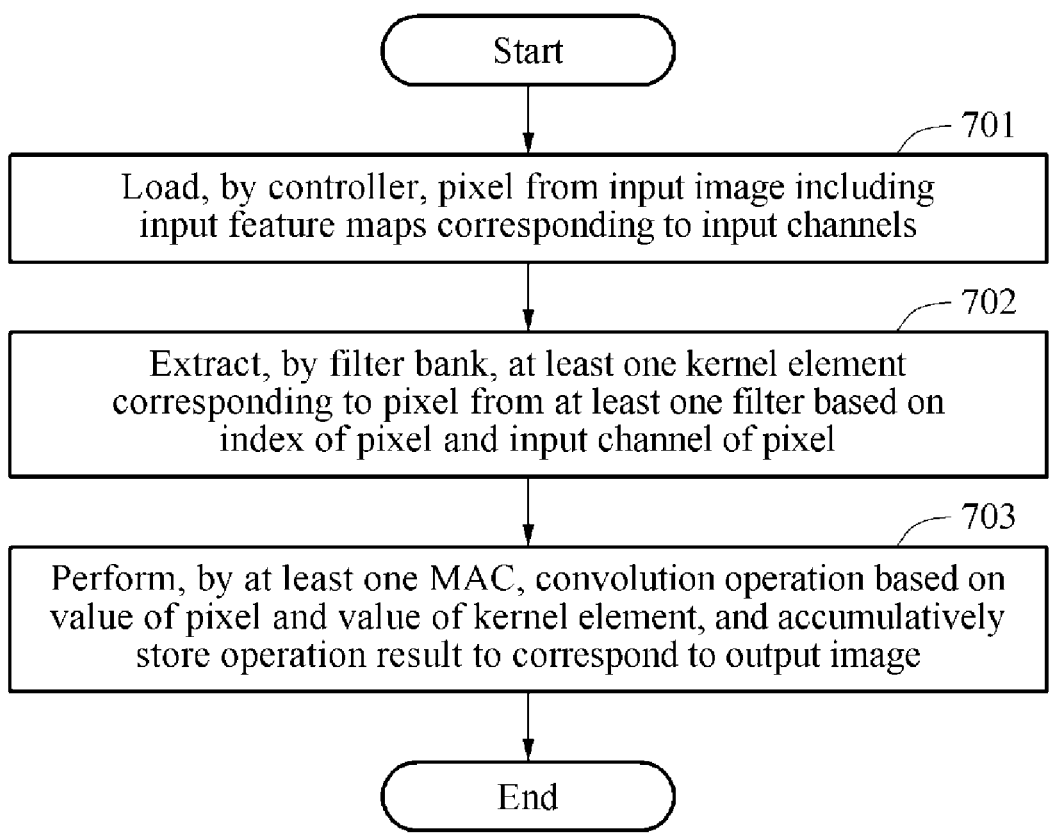
FIG. 7 is a flowchart illustrating a convolution processing method according to an example embodiment.

FIG. 7 is a flowchart illustrating a convolution processing method according to an example embodiment.

Referring to FIG. 7, in operation 701, a controller loads a pixel from an input image including input feature maps corresponding to input channels. An input feature map described herein includes pixels. In operation 702, a filter bank extracts at least one kernel element corresponding to the pixel from at least one filter based on an index of the pixel and an input channel of the pixel. In operation 703, at least one MAC performs a convolution operation based on a value of the pixel and a value of the kernel element, and accumulatively stores an operation result that corresponds to an output image. Example embodiments described with reference to FIGS. 1 through 6 may be applicable to the convolution processing method described with reference to FIG. 7, and thus a more detailed and repeated description is omitted here for brevity.

The above-described example embodiments may be recorded in non-transitory computer-readable media including program instructions to implement various operations which may be performed by a computer or hardware processor. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as compact disc read-only memory (CD-ROM) discs and digital versatile discs (DVDs); magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A convolution processing apparatus comprising:
   a controller configured to load a pixel of an input image, and skip a process associated with the loaded pixel in response to a value of the pixel being 0;
   a filter bank comprising at least one filter and configured to extract at least one kernel element corresponding to the pixel from the at least one filter based on an index of the pixel and an input channel of the pixel; and
   a multiplier-accumulator (MAC) configured to perform a convolution operation based on the value of the pixel and a value of the at least one kernel element, and accumulatively store an operation result of the convolution operation, the operation result corresponding to an output image.

2. The convolution processing apparatus of claim 1, further comprising:
   a plurality of input registers corresponding to predefined pixel rows,
   wherein the controller is further configured to:
      update an input register of a pixel row corresponding to a row of the pixel in an input feature map to record a column of the pixel in the input feature map and the input channel,
      provide the pixel row and the input channel to the filter bank, and
      provide the value of the pixel to the MAC, and
   wherein the filter bank is further configured to provide the value of the at least one kernel element to the MAC.

3. The convolution processing apparatus of claim 2, further comprising:
   a register configured to record a max column,
   wherein the at least one filter comprises kernel maps,
   wherein the controller is further configured to load a pixel that is subsequent to the pixel based on the column recorded in the input register and the max column, and
   wherein the max column is defined based on a width of the kernel maps.

4. The convolution processing apparatus of claim 2, further comprising:
   a register configured to record a max column,
   wherein the controller is further configured to:
      compare the column recorded in the input register with the max column,
      load a subsequent pixel corresponding to the row of the pixel in an input feature map that is interleaved with the input feature map based on a result of the comparing, and
      update the input register to record a column of the subsequent pixel in the interleaved input feature map and an input channel of the interleaved input feature map.

5. The convolution processing apparatus of claim 2, further comprising:
   a register configured to record a max column,
   wherein the controller is further configured to:
      compare the column recorded in the input register with the max column,
      load a subsequent pixel corresponding to a row that is subsequent to the row of the pixel in an input feature map that is interleaved with the input feature map based on a result of the comparing, and
      update an input register of a pixel row corresponding to a row of the subsequent pixel in the interleaved input feature map to record a column of the subsequent pixel in the interleaved input feature map and an input channel of the interleaved input feature map.

6. The convolution processing apparatus of claim 2, further comprising:
   a register configured to record a max column,
   wherein the controller is further configured to
      compare a column, which is recorded in an input register corresponding to a last pixel row among the input registers, with the max column, and
      update the register to record a max column greater than the max column based on a result of the comparing.

7. The convolution processing apparatus of claim 2, further comprising:
   a register configured to record a max column,
   wherein the MAC comprises output registers corresponding to rows and columns, and is further configured to update the output registers to record values of output pixels based on results of operations between values of pixels and values of kernel elements, and
   wherein the controller is further configured to:
      compare a column, which is recorded in an input register corresponding to a last pixel row among the input registers, with the max column, and
      transmit a slide signal to the MAC based on a result of the comparing, and wherein, the MAC is further configured to, in response to the slide signal, complete updating of a portion of the output registers.

8. The convolution processing apparatus of claim 1, wherein the input image comprises input feature maps corresponding to input channels, and
wherein pixels corresponding respectively to rows of the input feature maps are interleaved, and the interleaved pixels are recorded in a memory.

9. The convolution processing apparatus of claim 8, wherein values of sparsity maps (SMs) corresponding to the input feature maps are interleaved by each row of the input feature maps, and the interleaved values of the SMs are recorded in the memory,
wherein values of non-zero value lists (NZVLs) corresponding to the input feature maps are interleaved by each row of the input feature maps, and the interleaved values of the NZVLs are recorded in the memory,
wherein each of the SMs is a map indicating whether values of pixels of an input feature map are 0, and
wherein each of the NZVLs is a list of values not being 0 among values of pixels of an input feature map, and the values of the NZVLs correspond to the input channels.

10. The convolution processing apparatus of claim 9, wherein initial addresses corresponding to NZVLs of respective rows of the input feature maps are recorded in registers corresponding to the rows,
wherein an initial address corresponding to the SMs is recorded in a register corresponding to the SMs, and
wherein the controller is further configured to load the pixel from the memory based on the initial addresses corresponding to the NZVLs and the initial address corresponding to the SMs.

11. The convolution processing apparatus of claim 2, wherein the at least one filter comprises kernel maps, and
wherein the filter bank is further configured to provide, to the MAC, a value of a kernel element of at least one row corresponding to the pixel row from a kernel map corresponding to the input channel among kernel maps of a filter corresponding to the MAC.

12. The convolution processing apparatus of claim 2, wherein the at least one filter comprises kernel maps,
wherein the MAC comprises output registers corresponding to rows and columns, and
wherein a number of the pixel rows is defined based on a height of the kernel maps and a number of the rows.

13. The convolution processing apparatus of claim 1, wherein the at least one filter comprises kernel maps,
wherein the MAC comprises output registers corresponding to rows and columns,
wherein a number of the columns is defined based on a width of the kernel maps, and
wherein the MAC is further configured to update an output register to record a value of an output pixel based on a result of an operation between the value of the pixel and the value of the at least one kernel element.

14. The convolution processing apparatus of claim 13, further comprising:
an output buffer comprising buffer elements corresponding to rows and columns,
wherein a number of the rows of the output buffer is defined based on a number of the rows of the output registers, and
wherein the columns of the output buffer correspond to the MAC, and
wherein the MAC is further configured to provide values of output pixels recorded in each row of output registers of a column for which updating is completed to each row of buffer elements of a column corresponding to the MAC.

15. The convolution processing apparatus of claim 13, further comprising:
at least one pooling block corresponding to the MAC; and
an output buffer comprising buffer elements corresponding to rows and columns,
wherein the columns of the output buffer correspond to the MAC,
wherein the MAC is further configured to provide values of output pixels recorded in output registers of a column for which updating is completed to the pooling block corresponding to the MAC, and
wherein the pooling block is configured to:
calculate a value of a new output pixel based on a value of an output pixel recorded in a buffer element of a column corresponding to the MAC and the provided values of the output pixels, and
provide the value of the new output pixel to the buffer element.

16. The convolution processing apparatus of claim 1, further comprising:
a plurality of input registers corresponding to predefined pixel rows,
wherein the controller is further configured to:
load a first pixel corresponding to a first input channel and a second pixel corresponding to a second input channel,
update an input register of a first pixel row corresponding to a row of the first pixel to record a column of the first pixel and the first input channel,
update an input register of a second pixel row corresponding to a row of the second pixel to record a column of the second pixel and the second input channel,
provide the first pixel row and the first input channel to the filter bank,
provide the second pixel row and the second input channel to the filter bank,
provide a value of the first pixel to a first MAC, and
provide a value of the second pixel to a second MAC, and
wherein the filter bank is further configured to:
provide, to the first MAC, a value of a kernel element of at least one row corresponding to the first pixel row from a kernel map corresponding to the first input channel, and
provide, to the second MAC, a value of a kernel element of at least one row corresponding to the second pixel row from a kernel map corresponding to the second input channel.

17. The convolution processing apparatus of claim 1, wherein the at least one filter corresponds to at least one output channel of the output image,
wherein the MAC further comprises output registers corresponding to rows and columns,
wherein a number of the columns is defined based on a width of kernel maps,
wherein the filter bank is further configured to extract at least one first kernel element corresponding to the pixel from a first filter and extract at least one second kernel element corresponding to the pixel from a second filter, based on the index of the pixel and the input channel of the pixel, and wherein the MAC is further configured to:
  update a first output register corresponding to the first filter to record a first value of an output pixel based on a first result of a first operation between the value of the pixel and a first value of the first kernel element, and
  update a second output register corresponding to the second filter to record a second value of an output pixel based on a second result of a second operation between the value of the pixel and a second value of the second kernel element.

18. A convolution processing method comprising:
  loading, by a controller, a pixel of an input image comprising input feature maps corresponding to input channels, wherein an input feature map comprises pixels;
  skipping, by the controller, a process associated with the loaded pixel in response to a value of the pixel being 0;
  extracting, by a filter bank, at least one kernel element corresponding to the pixel from at least one filter of the filter bank based on an index of the pixel and an input channel of the pixel; and
  performing, by a multiplier-accumulator (MAC), a convolution operation based on the value of the pixel and a value of the at least one kernel element, and accumulatively storing an operation result of the convolution operation, the operation result corresponding to an output image.

19. The convolution processing method of claim 18, wherein input registers correspond to predefined pixel rows, the convolution processing method further comprising:
  updating, by the controller, an input register corresponding to a pixel row of the pixel in an input feature map to record a column of the pixel in the input feature map and the input channel;
  providing, by the controller, the pixel row and the input channel to the filter bank;
  providing, by the controller, the value of the pixel to the MAC; and
  providing, by the filter bank, the value of the at least one kernel element to the MAC.

20. A non-transitory computer-readable storage medium storing a program that is executed a computer to perform a convolution processing method comprising:
  loading, by a controller, a pixel of an input image comprising input feature maps corresponding to input channels, wherein an input feature map comprises pixels;
  skipping, by the controller, a process associated with the loaded pixel in response to a value of the pixel being 0;
  extracting, by a filter bank, at least one kernel element corresponding to the pixel from at least one filter of the filter bank based on an index of the pixel and an input channel of the pixel; and
  performing, by at least one multiplier-accumulator (MAC), a convolution operation based on the value of the pixel and a value of the at least one kernel element, and accumulatively storing an operation result of the convolution operation, the operation result corresponding to an output image.

* * * * *